United States Patent
Liu (10) Patent No.: US 9,903,483 B2
(45) Date of Patent: Feb. 27, 2018

(54) MECHANICAL ENERGIZED SEALING BALL VALVE

(71) Applicant: Xiaoqi Liu, Cambridge (GB)

(72) Inventor: Xiaoqi Liu, Cambridge (GB)

(73) Assignee: Zibo Votaisi Petrochemical Equipment Co., Ltd, Quan Lu, High-Tech Zone, Zibo, Shandong (CN)

( * ) Notice: Subject to any disclaimer, the term of this patent is extended or adjusted under 35 U.S.C. 154(b) by 0 days.

(21) Appl. No.: 15/678,507

(22) Filed: Aug. 16, 2017

(65) Prior Publication Data

US 2017/0343120 A1 Nov. 30, 2017

Related U.S. Application Data

(63) Continuation of application No. PCT/CN2017/080179, filed on Apr. 12, 2017.

(30) Foreign Application Priority Data

May 26, 2016 (CN) .................... 2016 2 0491127 U (51) Int. Cl.
  *F16K 5/20* (2006.01)
  *F16K 31/53* (2006.01)

(52) U.S. Cl.
  CPC ............ *F16K 5/204* (2013.01); *F16K 31/535* (2013.01)

(58) Field of Classification Search
  CPC .................................. F16K 5/204; F16K 5/20
  USPC ................................................ 251/160, 188
  See application file for complete search history.

(56) References Cited

U.S. PATENT DOCUMENTS

| | | | | |
|---|---|---|---|---|
| 1,803,773 A | * | 5/1931 | Schmidt .................. | F16K 5/204 251/160 |
| 2,072,965 A | * | 3/1937 | Robinson ................ | F16K 5/184 251/188 |
| 2,200,474 A | * | 5/1940 | Heggem .................. | F16K 5/204 251/163 |
| 2,277,975 A | * | 3/1942 | Heggem .................. | F16K 5/204 251/163 |
| 2,690,894 A | * | 10/1954 | Blevans ................ | F16K 5/0647 251/163 |
| 2,729,421 A | * | 1/1956 | Baer, Sr. .................. | F16K 5/204 251/188 |
| 2,988,109 A | * | 6/1961 | Komrosky .............. | F16K 5/204 137/630.15 |
| 3,033,513 A | * | 5/1962 | Vulliez ................... | F16K 5/162 251/163 |

(Continued)

*Primary Examiner* — Reinaldo Sanchez-Medina
*Assistant Examiner* — David Colon Morales
(74) *Attorney, Agent, or Firm* — Larson & Larson, P.A.; Justin P. Miller; Patrick A. Reid (57) ABSTRACT

The invention relates to a mechanical energized sealing ball valve comprising a seat, a ball assembly, and a valve stem. The ball comprises a ball and a sealing member. The valve stem drives the ball to rotate between open position and close position. When the ball reaches the close position, the sealing member jacks up from the ball to press and sit against the seat. The invention has the advantages that: the valve has a compact structure, the friction-free on/off is achieved, the mechanical energized sealing force is even and reliable, the ball is retracted and locked in the opening position to protect against turbulence-induced damage, low operating torque, the open/close operation is rapid, and the valve stem seal operates simply and reliably.

14 Claims, 4 Drawing Sheets

(56) References Cited

U.S. PATENT DOCUMENTS

| | | | | |
|---|---|---|---|---|
| 3,124,333 A * | 3/1964 | Sivyer | F16K 5/204 | 251/161 |
| 3,515,371 A * | 6/1970 | Jones, Jr. | F16K 5/204 | 251/214 |
| 3,625,478 A * | 12/1971 | Killian | F16K 5/204 | 251/163 |
| 3,827,671 A * | 8/1974 | Bolden | F16K 5/06 | 251/172 |
| 3,934,606 A * | 1/1976 | Matthews | F16K 5/204 | 137/454.6 |
| 3,941,351 A * | 3/1976 | Graham | F16K 5/0647 | 251/161 |
| 4,029,292 A * | 6/1977 | Kramer | F16K 5/204 | 251/163 |
| 4,141,536 A * | 2/1979 | Graham | F16K 5/204 | 251/161 |
| 4,174,090 A * | 11/1979 | Nelimarkka | F16K 5/204 | 251/172 |
| 4,174,825 A * | 11/1979 | Nelimarkka | F16K 5/204 | 251/172 |
| 4,296,913 A * | 10/1981 | Hoyer | F16K 5/0647 | 251/163 |
| 4,509,718 A * | 4/1985 | Bormioli | F16K 1/24 | 251/163 |
| 4,546,953 A * | 10/1985 | Vinciguerra | F16K 1/24 | 251/162 |
| 4,634,098 A * | 1/1987 | Varden | F16K 1/24 | 137/559 |
| 4,917,354 A * | 4/1990 | Chambers | F16K 5/204 | 251/160 |
| 4,936,547 A * | 6/1990 | Obst | F16K 5/204 | 251/304 |
| 4,940,210 A * | 7/1990 | Gilmore | F16K 5/204 | 251/160 |
| 4,962,911 A * | 10/1990 | Soderberg | F16K 5/0605 | 251/159 |
| 5,137,258 A * | 8/1992 | Takamatsu | F16K 5/204 | 251/160 |
| 5,193,780 A * | 3/1993 | Franklin | F16K 5/0647 | 137/554 |
| 5,205,535 A * | 4/1993 | Nevrekar | F16K 5/204 | 251/161 |
| 5,265,845 A * | 11/1993 | Gilliam | F16K 5/204 | 251/163 |
| 5,308,039 A * | 5/1994 | King | F16K 5/204 | 251/188 |
| 5,342,028 A * | 8/1994 | Nevrekar | F16K 5/204 | 251/163 |
| 5,417,404 A * | 5/1995 | Varden | F16K 5/204 | 251/165 |
| 6,378,841 B1 * | 4/2002 | Russell | F16K 5/201 | 251/158 |
| 7,740,228 B2 * | 6/2010 | Simpson | F16K 1/221 | 251/305 |
| 7,775,502 B2 * | 8/2010 | Ohta | F16K 5/0647 | 251/163 |
| 9,004,448 B2 * | 4/2015 | Qian | F16K 5/0647 | 251/158 |

\* cited by examiner

MECHANICAL ENERGIZED SEALING BALL VALVE

CROSS-REFERENCE TO RELATED APPLICATION

This application is a continuation of PCT application number PCT/CN2017/080179, filed 2017 Apr. 12, title translated as "Forced Sealing Ball Valve," which in turn claims priority to China application number ZL 2016 20491127.2, filed 2016 May 26, title translated as "Forced Sealing Ball Valve."

FIELD

The invention is a ball valve, and in particular a mechanical energized sealing ball valve.

BACKGROUND

In the flow control application, for example, oil/gas production process switching, pipeline shut-off, metering, pressure regulation, molecular sieve switching, compressor inlet/outlet, hydrogen application in oil refining process, air separation of synthetic ammonia equipment, and the like, which require frequent operation and have strict requirements on flow on-off control and closing tightness, it is desired that valves produce a pressure drop as small as possible and can provide a forced torque seal without the influence of the pressure of fluid within the pipeline. Mechanical energized sealing ball valves are recognized as an ideal solution.

However, for the conventional rising stem mechanical energized sealing ball valve, although there is no contact or friction between the ball and the seat during most of the opening/closing stroke, sliding friction exists between the ball and seat sealing area during the final ball-seat engagement stage. Thus, valve operation is not a true friction-free rotation, and the ball against seat sealing relies on the stem wedging against ball, with ball being held by lower trunnion. As a result the movement is unsteady and susceptible to the influence of tolerance of the relative position of the seat and the lower trunnion. Additionally, the valve stem portion and its assembly have a complicated structure and require the combination of linear movement and rotation movement during the opening/closing process. The requirement for machining precision is strict, the risk of valve stem leakage is high, and the time of opening/closing operation is too long. The following six documents of mechanical energized sealing ball valve are found by SIPO patent inquiry:

Publication No. CN104295764A, Application No. 2014105008955: Disclosed is a valve that opens or close using a valve stem and a ball in eccentric arrangement and synchronous rotation. The design is essentially a modification of eccentric butterfly valve, in which a relative sliding friction between seat and ball sealing surface is produced due to a large angular stroke vector existing during the final siting stage of the ball and seat. Thus, it is not a true friction-free rotation, as the closing operation is an angular stroke, and the resulting normal component of force between the ball and the seat is not large, which may impact the sealing reliability and actual service life.

Publication No. CN103727260A, Application No. 2014100163761: Disclosed is a ball valve, in particular a mechanical energized sealing ball valve, comprising a valve body, a secondary valve body, a ball, a seat, and a secondary valve body fluid port, and a stud-nut-driving-type mechanical energized sealing device disposed on the shell of the secondary valve body fluid port. The worm wheel and the driving stud are coupled via a flat key, when the driving stud makes a rotational movement, the axial sliding key groove of the driven nut fits the driving stud in a rotating manner, enabling an axial linear movement along the guide key on the secondary valve body fluid port. As a result, a desired sealing specific pressure is generated between the seat and the ball within the valve cavity by the pressure generated outside the body through a pressure transfer system, thereby low-torque opening/closing and mechanical energized sealing can be achieved, and the interlinked actuation of the stud-nut energized sealing device and the electric actuator during opening/closing and sealing process are completed through an automatic control system. The design applies two operating mechanisms, one of them operates the ball to rotate 90 degrees, and the other operates the said secondary valve body for driving the seat to sit against ball. The design has many potential leakage paths, complicated structure and bulky size, and is not able to meet standard valve face-to-face dimensions.

Publication No. CN103527809A, Application No. 2013105342621: Disclosed is a valve comprising a valve body, a valve bonnet, a valve stem, a wedged plug and sealing members, characterized in that the top of the valve body is connected with the valve bonnet, the valve stem is vertically mounted in the center of the top of the valve body through a support, the wedged plug in the cavity of the valve body is fixed at the bottom of the valve stem by a pin through a hole in the center of the valve bonnet to synchronize the movement of the valve stem and the wedged plug, that is, rotating and raising aligned to a fixed axis. A fixed shaft is perpendicularly disposed in the bottom center of the cavity, the fixed shaft is matched with a hole in the bottom center of the wedged plug, the valve sealing members are fixed at the two sides of the bottom of the cavity through T-shaped grooves, valve sealing member stops are disposed on the top of the valve sealing member and on the inner walls of the two sides of the cavity, and the valve sealing member stops on the two sides are firmly connected with the two side walls of the wedged plug. The design is actually a mechanical energized plug valve (also known as DBB plug valve in the industry), although the valve can achieve mechanical energized sealing in a closed position, owing to the sliding-type sealing member configuration, the valve sealing member to be influenced by the turbulence when the valve is in the open position. At present, the design is used for applications under low pressure liquid working conditions only.

Publication No. CN102979929A, Application No. 2012105315085: Disclosed is a valve comprising a ball, a seat and a sealing ring seat disposed between the ball and the seat to perform the sealing, and a hydraulic device for pushing the sealing ring seat in the axial direction of the sealing ring seat, the hydraulic device being disposed between the seat and the sealing ring seat. The design realizes a forced seal by applying a pressure to the seal ring between the seat and the ball by using a set of hydraulic system, but the hydraulic leakage and complicated structure of the valve may affect the sealing reliability and service life of the valve.

Publication No. CN105370909A, Application No. 2014104406033: Disclosed is an opening/closing part having two eccentric spherical members. Such eccentric structure allows each of the two eccentric spherical surfaces to make a movement in the axial direction of the downstream seat and the upstream seat when the valve stem drives the opening/closing part to make a rotational movement, resulting in the effect of compressing or releasing the seat, thereby realizing the forced seal of the opening/closing part relative to the downstream seat and the upstream seat in a particular valve position. The valve of the design may be influenced by turbulence in the opening position, the two eccentric spherical members may be damaged by turbulence vibration, which affects the reliability and service life of the valve.

Publication No. CN104132157A, Application No. 2013101575904: Disclosed is a forced seal valve based on modular design and angular stroke operation, mainly comprising a valve body, an opening/closing part, a valve bonnet, a valve stem, a seat, a flow guide barrel, a seat support plate, a flow guide barrel support plate, an operating mechanism and a drainage valve. The opening/closing part is arranged between the seat and the flow guide barrel, by adjusting the relative position of sphere center and radii of the convex spherical surface and center of the concave spherical surface, the thicknesses of individual portions of the opening/closing part can be adjusted to adjust the sealing specific pressure between the opening/closing part and the seat when the valve is located in different valve positions, so that the valve realizes a forced seal in a certain valve position. Accordingly, the design is not a mechanical energized sealing ball valve in a whole sense.

SUMMARY

An object of the invention is to provide a technical solution of mechanical energized sealing ball valve, thus improving the operating performance and sealing tightness of the ball valve.

In order to achieve the above purpose, the technical solution adopted by the invention is as follows: A mechanical energized sealing ball valve, comprising a seat, a ball assembly and a valve stem, characterized in that the ball assembly comprises a ball and a sealing member, the valve stem drives the ball to rotate between open position and close position, when the ball reaches the close position, the sealing member jacks-up of the ball to sit against the seat.

Furthermore, a thread driving wheel is disposed on the ball and connected with the sealing member through threads, and the thread driving wheel jacks and retracts the sealing member through the threads during rotating.

Furthermore, the valve stem drives the thread driving wheel to rotate.

Furthermore, the thread driving wheel is cut with gear teeth, and the valve stem drives the thread driving wheel to rotate through a sealing driving gear.

Furthermore, an intermediate transmission gear is disposed between the thread driving wheel and the sealing driving gear.

Furthermore, the sealing member and the ball are engaged by means of linear movement.

Furthermore, when the ball rotates to the close position from the open position, the ball stops rotating and the valve stem continues rotating towards the closing direction, so that the sealing member sits against the seat.

Furthermore, the rotation stroke of the ball is 90°.

Furthermore, the lower trunnion of the ball is provided with a 90° fan-shaped projection, and the lower trunnion chamber of the valve body is provided with a 180° limiting slot.

Furthermore, the valve stem drives the ball to rotate through an elastic component.

Furthermore, the elastic component is a torsion spring.

Furthermore, a torsion spring shaft is disposed at the bottom of the valve stem, with the torsion spring being sleeved on the torsion spring shaft, and the valve stem and the ball are respectively provided with torsion spring pin holes, with the torsion spring pins of the torsion spring being embedded into the torsion spring pin holes of the valve stem and the ball.

Furthermore, the elastic element applies to the ball a pre-driving force for rotating the ball towards the closing position.

Furthermore, the sealing member retracts towards the ball and contacts the ball during the opening process of the mechanical energized sealing ball valve.

The invention has the advantages that: the valve has a compact structure, the true sealing friction-free face in both open and close operation, the sealing force is even and reliable, the ball assembly is retracted and locked in the opening position to protect against turbulence-induced damage, the moment of ball valve operating torque is small, the open/close operation is rapid, and the valve stem seal is simple and reliable.

The invention will now be described in detail with reference to the accompanying drawings and examples.

DETAILED DESCRIPTION

Figure 1:
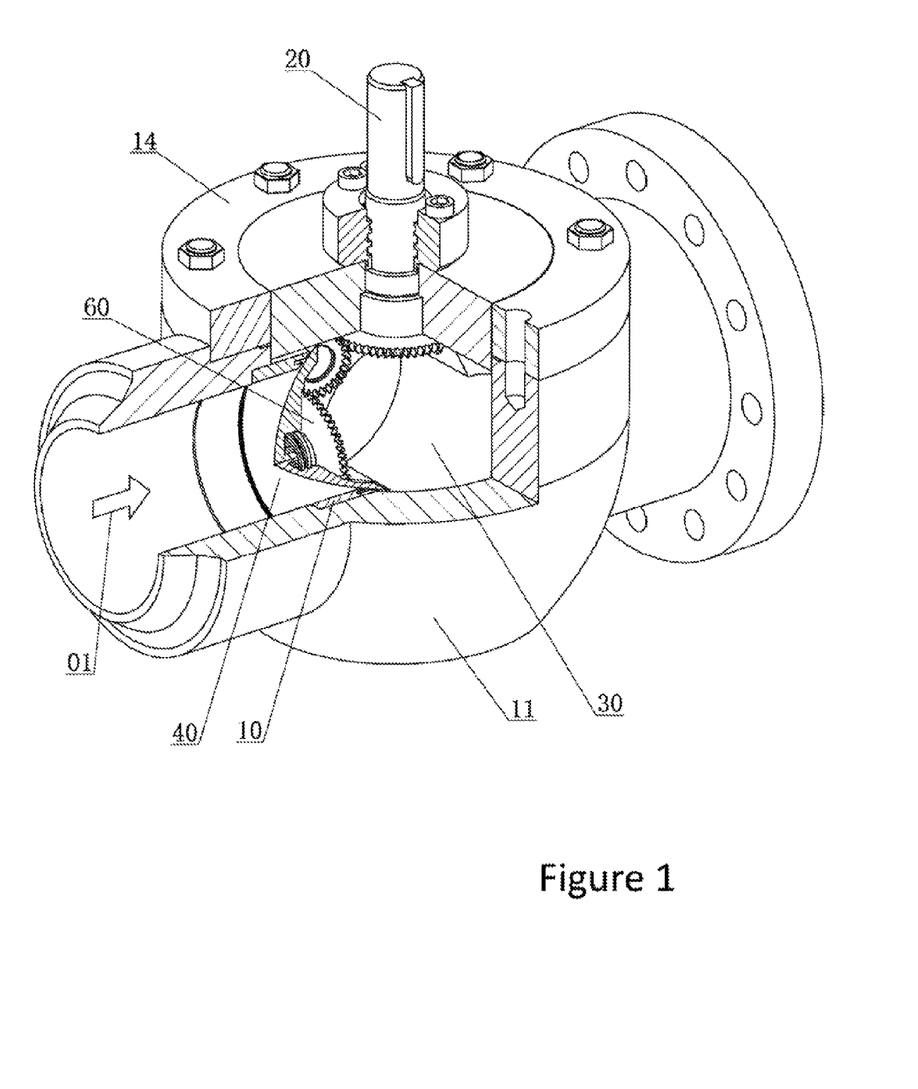
FIG. 1 is a structural view of the invention.
Figure 2:
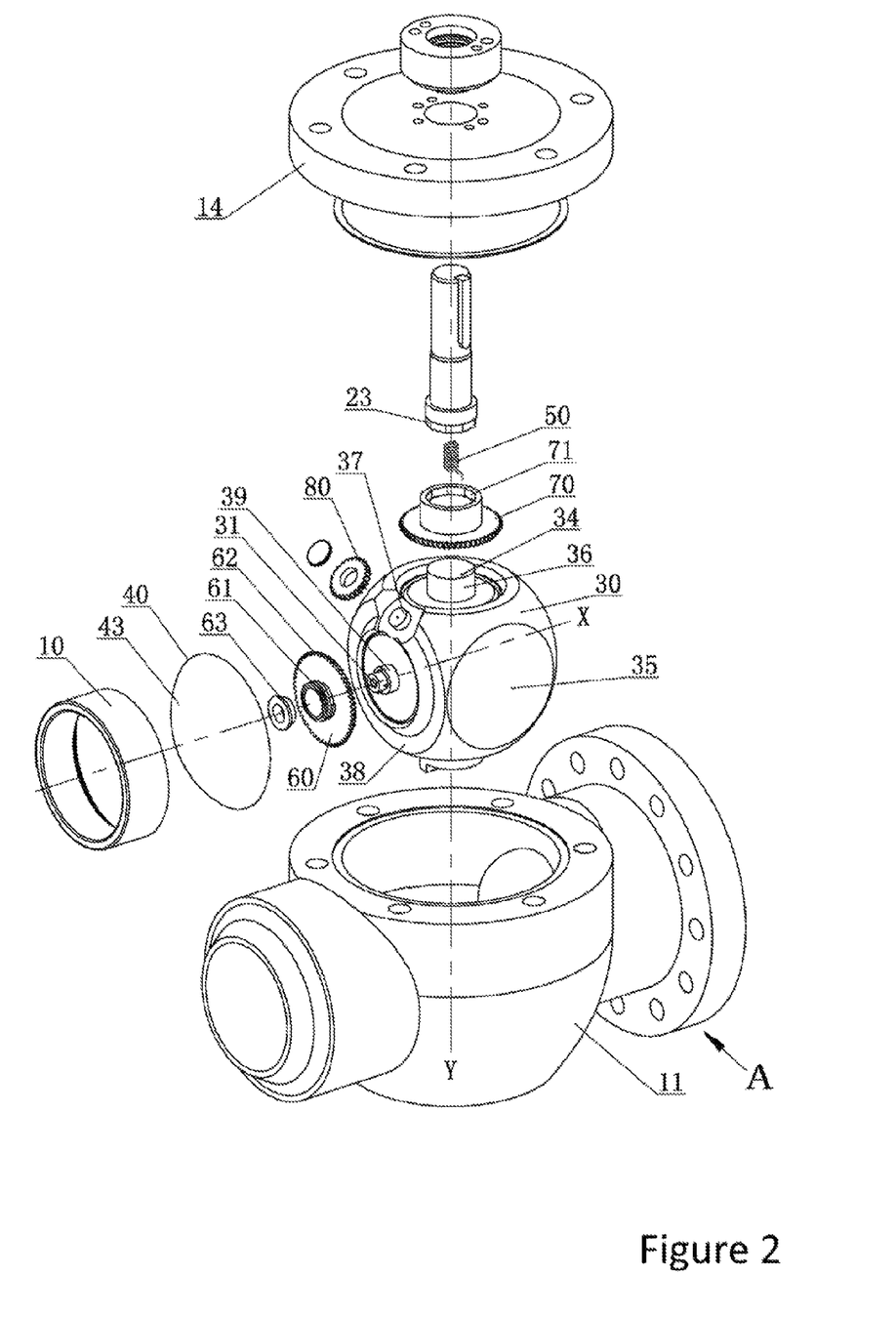
FIG. 2 is an exploded structural view of the invention.
Figure 3:
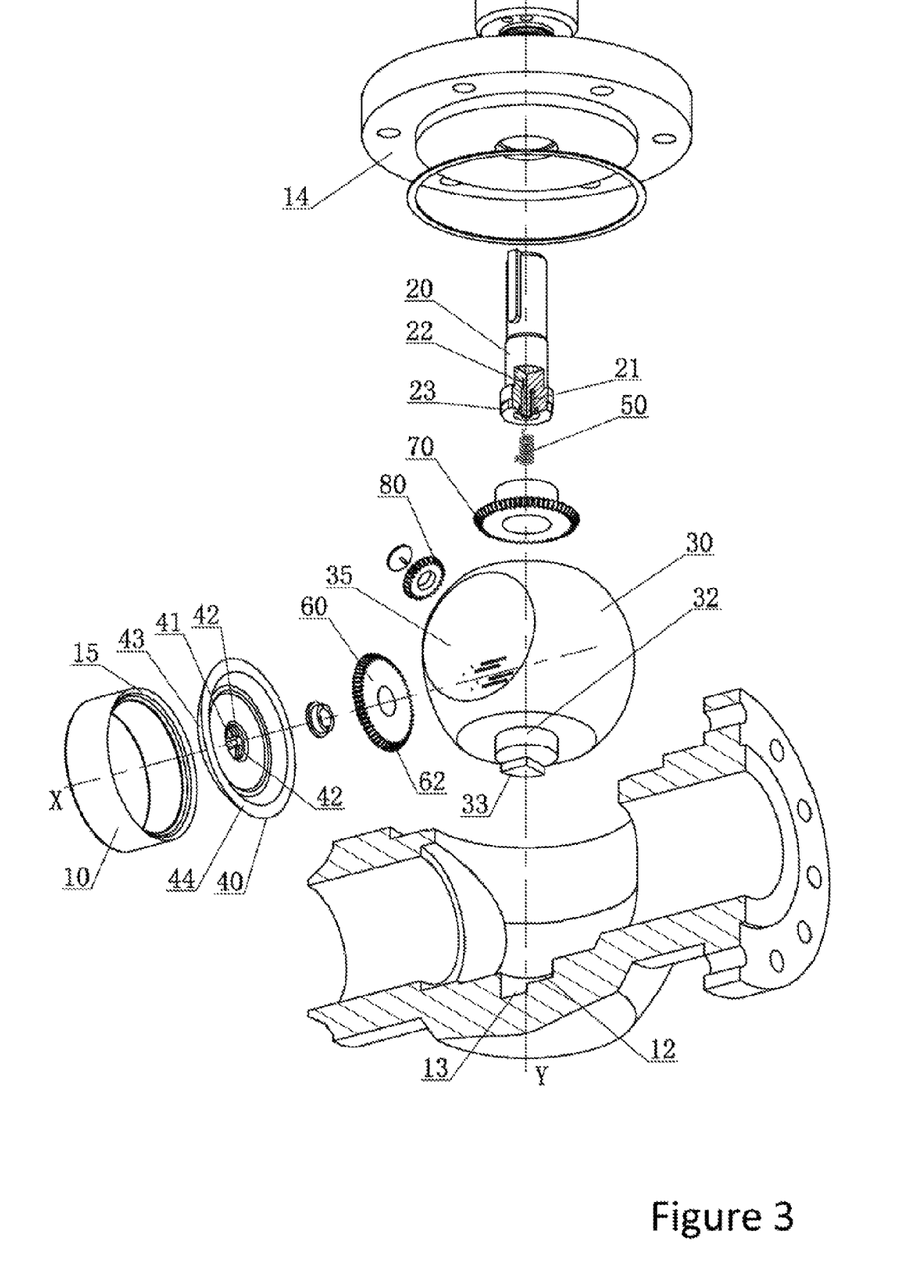
FIG. 3 is an exploded structural view of the invention, taken along the A axis of FIG. 2.
Figure 4:
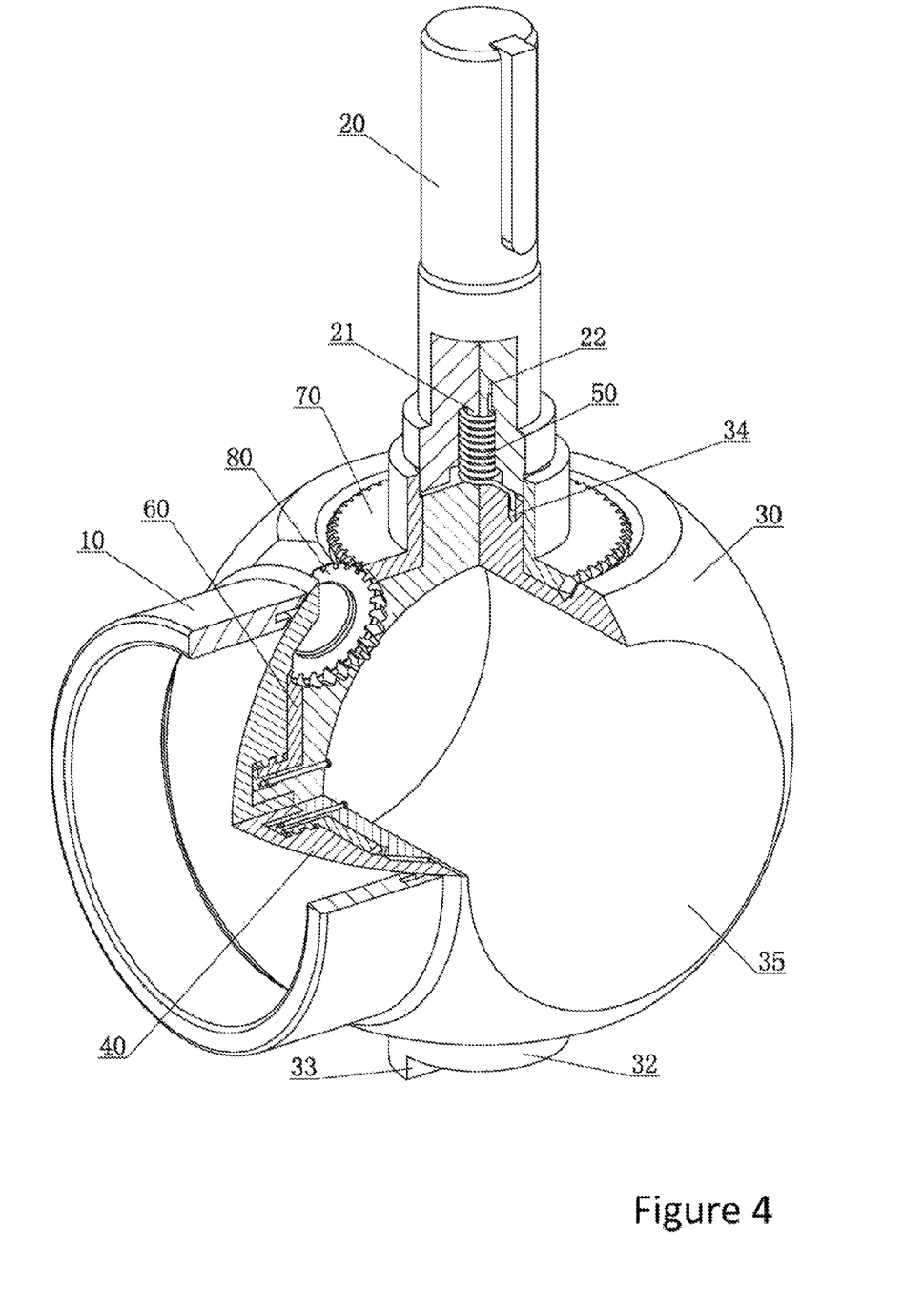
FIG. 4 is a structural view of a ball, a seat, and a valve stem of the invention.

As shown in FIG. 1-4, a mechanical energized sealing ball valve comprising a seat 10, a ball assembly and a valve stem 20, the ball assembly comprises a ball 30 and a sealing member 40, the valve stem drives the ball to make a rotation between open position and close position, when the ball rotates to the close position, the sealing member jacks out of the ball to sit against the seat.

A thread driving wheel 60 is disposed on the ball and connected with the sealing member through threads, and the thread driving wheel jacks up and get back the sealing member through the threads during rotating.

The valve stem drives the thread driving wheel to rotate.

The thread driving wheel is cut with gear teeth 62, and the valve stem drives the thread driving wheel to rotate through a sealing driving gear 70.

An intermediate transmission gear 80 is disposed between the thread driving wheel and the sealing driving gear.

The sealing member and the ball is constrained by means of linear movement against ball.

The ball stops at close position while rotating to the close position from the open position, and the valve stem continues rotating towards the closing direction, drives the sealing member sit against the seat.

The rotation stroke of the ball is 90°.

The lower rotating shaft of the ball is provided with a 90° fan-shaped projection 33, and the lower rotating shaft chamber of the valve body is provided with a 180° limiting slot 13.

The valve stem drives the ball to rotate through an elastic component 50.

The elastic component is a torsion spring.

A torsion spring shaft 21 is disposed at the bottom end of the valve stem, with the torsion spring being sleeved on the torsion spring shaft, and the valve stem and the ball are respectively provided with torsion spring pin holes (22, 34), with the torsion spring pins of the torsion spring being embedded into the torsion spring pin holes of the valve stem and the ball.

The torsion spring applies to the ball a pre-driving force for rotating the ball towards the closing position.

The sealing member retracts towards the ball and contacts the ball during the opening of the valve.

Example 1

As shown in FIG. 1-4, a mechanical energized sealing ball valve comprises a seat 10, a ball assembly and a valve stem 20, and the ball assembly comprises a ball 30 and a sealing member 40.

The ball is mounted inside the valve body 11, the valve body is provided with an upper cover 14, and the valve stem is mounted within the upper cover.

The profile of the ball is spherical, the ball has a flow port 35 in a way that the axis of the ball flow port is perpendicular to the rotation axis of the ball (i.e., the rotation axis of the valve stem), and when the ball is located in the open position, the flow port is aligned to the seat, so that a medium flows through the ball valve. The ball is provided with a jack-up guide hole 31, in this example, the jack-up guide hole being a hexagonal hole. The axis X of the jack-up guide hole is perpendicular to the rotation axis Y of the ball and passes through the sphere center of the ball, and the axis of the jack-up guide hole is also perpendicular to the axis of the ball flow port. A lower trunnion 32 is disposed at the lower end of the ball, the lower trunnion being coaxial to the rotation axis of the ball, and a 90° fan-shaped projection 33 is disposed at the end of the lower trunnion. An upper trunnion 36 is disposed at the top of the ball, and a torsion spring pin hole 34 is disposed at the top of the upper trunnion. An intermediate transmission shaft 37 is disposed between the upper trunnion and the jack-up guide hole. The ball is provided with a ball-receiving surface 38 on the jack-up guide hole side, the ball-receiving surface being perpendicular to the axis of the jack-up guide hole.

The sealing member 40 is part of ball, comprising a spherical surface 43 and a ball-receiving matching face 44, and the sealing member is provided with a jack-up threaded hole 42 in the center of the ball-receiving matching face side. The sealing member is constrained by means of linear movement against ball, a guide bar 41 is provided in the jack-up threaded hole, the guide bar is a hexagonal bar and in sliding fit with the jack-up guide hole 31 of the ball, so that the sealing member makes a reciprocating linear movement along the axis of the jack-up guide hole. The hexagonal shaft disables the sealing member from rotating with respect to the ball, so that the thread driving wheel drives the sealing member through the threads in linear movement.

The thread driving wheel 60 is disposed on the ball, and the thread driving wheel is provided with a jack-up stud 61 which matches the jack-up threaded hole of the sealing member. The thread driving wheel is cut gear teeth 62, which is coaxial to the jack-up stud, the teeth 62 are conical teeth. The thread driving wheel is disposed on a shaft 39 of the ball through a locking ring 63. A sealing driving gear 70 is disposed on the valve stem, the sealing driving gear being a cone gear, and a polygonal hole 71 is disposed in the center of the sealing driving gear. An intermediate transmission gear 80 is disposed between the thread driving wheel and the sealing driving gear such that the intermediate transmission gear is located on the intermediate transmission shaft 37 of the ball, the intermediate transmission gear being also a cone gear, and the intermediate transmission gear is engaged with the sealing driving gear and the gear teeth of the thread driving wheel respectively, so that the valve stem drives the thread driving wheel to rotate via the sealing driving gear, and the thread driving wheel drives the sealing member towards the seat back and forth via matched threads in between. The ball is disposed within the valve body 11, the valve body is provided with a lower trunion chamber 12 corresponding to the lower trunion of the ball, the lower trunion chamber is provided with a 180-degree limiting slot 13 corresponding to the fan-shaped projection 33 at the bottom of the lower trunion of the ball. Thus, the rotation stroke of the ball is limited to 90°.

The bottom of the valve stem is a polygon 23, and the top of sealing driving gear is in a driving mate with the bottom of the valve stem through the polygonal hole 71, so that the valve stem drives the sealing driving gear to rotate synchronously.

During the valve closing operation, the valve stem drives the ball to rotate through a torsion spring 50. The connection end of the valve stem is provided with a torsion spring shaft 21 which extends into the valve stem, with the torsion spring being sleeved on the torsion spring shaft, the valve stem is provided with a torsion spring pin hole 22, and the two torsion spring pins of the torsion spring are embedded in the torsion spring pin hole 22 of the valve stem and the torsion spring pin hole 34 of the ball respectively. It is desired that the torsion spring maintains a force on the ball, rotating the ball in the closing direction. Thus, when the ball is in the open position, the torsion spring applies a pre-driving force to the ball, rotating the ball towards the closing direction. With the driving mate between the valve stem and the sealing driving gear, the pre-driving force is transferred by the intermediate gear, so that thread driving gear drives the sealing member to tighten together against the ball, resulting in a balance.

The seat is provided with a seal 15 that matches with the spherical surface of the sealing member to build up sealing, and when the ball is in the opening position, a rotation gap is provided between the seat and the ball. The valve stem drives the ball open and close. During the valve closing operation, the valve stem drives the ball to rotate via the torsion spring 50. When the ball rotates from the open position towards the close position, due to the pre-driving force applied to the ball by the torsion spring, the ball rotates in synchronization with the valve stem, avoiding the relative rotation between the sealing driving gear and the ball, so that the sealing member does not jack up from the ball. In the closed position, the ball stops rotating due to the fan-shaped projection 33 stop, while the valve stem keeps rotating towards the closing direction, so as to drive the sealing member to jack up the ball against the seat, resulting in the sealing contact between the spherical surface of the sealing member and the seal of the seat, thereby mechanical energized sealing is built.

In the opening process of the valve, the valve stem rotates towards the opening direction and drives the sealing driving gear to rotate synchronously. Due to the force of the torsion spring, the ball does not rotate, and the sealing driving gear drives the sealing member to retract towards the ball, so that the ball-receiving matching face 44 of the sealing member is in contact with the ball-receiving surface 38 of the ball. The valve stem keeps rotating towards the opening direction, and as the sealing member is in contact with the ball, the sealing driving gear stops rotating with respect to the ball, so that the valve stem drives the ball and the sealing member to reach the opening position simultaneously.

In order to ensure smooth open/close operation of the ball, after the sealing member retracts in place, the outer profile of the sealing member should not exceed the overall spherical profile of the ball, in this example, the outer profile of the sealing member and the outer profile of the ball form an integral spherical profile.

Example 2

In this example, a mechanical energized sealing ball valve is provided, which is a structural modification of the mechanical energized sealing ball valve of Example 1.

According to the mechanical energized sealing ball valve of this example, two sealing members are disposed on the ball and both mate with an upstream seat and a downstream seat.

Example 3

In this example, a mechanical energized sealing ball valve is provided, which is a structural modification of the mechanical energized sealing ball valve of Example 1.

A thread-driving wheel is disposed on a ball and connected with a sealing member through threads, and the thread driving wheel drives the sealing member to jack up the ball during rotating.

The thread driving wheel is provided with a threaded hole, the sealing member is provided with a stud which matches threaded hole of the thread driving wheel. The thread driving wheel drives the sealing member to jack up and get back towards a seat through the threaded hole.

Example 4

In this example, a mechanical energized sealing ball valve is provided, which is a structural modification of the mechanical energized sealing ball valve of Example 1.

The sealing member is provided with a guide hole, the guide hole being a prismatic hole, the ball is provided with a guide shaft, the guide shaft being a prismatic shaft in sliding fit with the prismatic hole of the sealing member.

Example 5

In this example, a mechanical energized sealing ball valve is provided, which is a structural modification of the mechanical energized sealing ball valve of Example 4.

In this example, the ball and the sealing member are connected through a key shaft match, so that the sealing member jack up and get back towards the seat.

Example 6

In this example, a mechanical energized sealing ball valve is provided, which is a structural modification of the mechanical energized sealing ball valve of Example 1 or Example 4.

In this example, the ball and the sealing member are connected through a splined shaft match, so that the sealing member jack up and get back towards the seat.

Example 7

In this example, a mechanical energized sealing ball valve is provided, which is a structural modification of the mechanical energized sealing ball valve of Example 1.

The bottom of the valve stem is a spline, and the sealing driving gear top is provided with a splined hole which is engaged with the connection end of the valve stem. The sealing driving gear forms a driving mate with the bottom of the valve stem through the splined hole, so that the valve stem drives the sealing driving gear to rotate synchronously.

Example 8 in this example, a mechanical energized sealing ball valve is provided, which is a structural modification of the mechanical energized sealing ball valve of Example 1.

In this example, the valve body is side-entry body configuration.

Example 9 in this example, a mechanical energized sealing ball valve is provided, which is a structural modification of the mechanical energized sealing ball valve of Example 1.

In this example, the valve body is all-welded body configuration.

Based on the basic principle of sealing, the invention fully solves the issues and concerns of the existing mechanical energized sealing ball valves. For example, the following issues and concerns are solved: relative sliding friction at the final stage of siting movement, insufficient normal component of sealing force of the seat, large structure and bulky size, need of hydraulic systems in certain designs, and potential damages caused by turbulence on the ball/plug assembly in case that the valve is in the open position in certain design.

The invention adopts the design of trunnion mounted ball and stationary seat. A part of the ball assembly (for a plug valve, a part of the plug assembly), i.e., sealing member, is jacked towards the seat by the threaded jack-up mechanism, thereby build up sealing by mechanical energized force. The range of movement of the ball of the valve is limited by fine stop at the lower trunnion chamber of the valve body, thereby accurately stopped in 90-degree open/close position; with the torsion spring, the sealing member is tightened and locked against the ball in all other positions than the sealing position, so that 90 degree ball-seat friction free rotation can be achieved. In addition, the concern in the existing designs that sealing member and/or other parts attached to ball are damaged by turbulence is solved. After being aligned to the closing position, the ball stops rotating by fine stop of the lower trunnion, at this moment, the thread driving wheel is rotated by valve close torque transmitted by a set of gear mechanisms integrated to the ball, so that the sealing member is jacked up against seat firmly, and mechanical energized torque sealing is built. Such seating movement is evenly and aligning the normal vertical direction of the seat, so that there is no relative rotating/sliding friction between the sealing surfaces, thereby avoiding the relative sliding friction between the sealing surfaces at the final stage of the closing stroke of the conventional mechanical energized ball valves. With the principle of thread jack up configuration, the sealing member acts steadily and reliably, thereby ensuring the accuracy of siting between the sealing member and seat sealing surfaces. The valve has a compact structure which can conform to the standard face-to-face dimension, even may be shorter. The valve stem seal is a typical rotation stem seal configuration, which is uncomplicated and reliable. Also, the time of valve open/close stroke is short.

The invention has the innovation in the following aspects:

Smoothly-operating sealing member thread jack-up mechanism;

Aligning the same axial, the seat is positioned after the sealing member, after the thread driving wheel, after the ball. While closing the valve, thread driving wheel can only be energized by the operating torque and to rotate when the ball and the sealing member align to the seat, given the fact that the sealing member is guided by its hexagonal shaft, the sealing member is jacked up by thread driving wheel rather than being rotated together with the thread driving wheel, and sited against seat eventually, and mechanical energized sealing is built thereby.

In this process, the thread jack-up action produces a sitting force perpendicular to the seat sealing surface, which avoids sliding friction as there is no any kind of rotation movement other than the jack-up press, sealing build-up is reliable and evenly Feature of Self-Cleaning:

While opening valve as the seat and the sealing member move apart evenly: on top of torsion spring force, valve open torque will drive valve open. It starts from the reverse rotation of the thread driving wheel, and due to the guide of the hexagonal shaft, the sealing member is disengaged from the seat rather than rotating together with the thread driving wheel, and finally locked tightly against the ball under the torsion spring force and the valve-opening torque, at this moment, the ball assembly will rotate until the valve is fully opened.

In this process, the sealing member and the seat move apart evenly without any rotation movement in between the sealing member and the sea, and if foreign things are accumulated around the seat, the foreign things may be uniformly swept off by the medium at any angle, thereby it can be self-cleaned.

The torque for opening/closing the valve is directly applied to the sealing driving gear through the valve stem. Before the sealing member and the seat are aligned, the gear set remains locked without rotation, and when the sealing member and the seat are aligned, the valve stem rotating torque firstly drives the sealing driving gear to rotate, then the torque is transferred to the thread driving wheel by the intermediate transmission gear, so that the thread driving wheel rotates the thread jack-up mechanism directly, thereby achieve mechanical energized sealing. By using the intermediate transmission gear for torque transferring, the size of the ball assembly can be greatly reduced, and thus greatly reduce the size of the whole valve.

The torsion spring locking device functions interlink movement of the ball and the sealing driving gear: the torsion spring having a simple and reliable structure is disposed between the valve stem and the ball, The polygonal shaft at bottom of the valve stem is engaged with the polygonal hole at the top sealing driving gear to form the driving mate (alternatively, splined mate), once the sealing member and the ball are tightened by the gear set mechanism, an appropriate locking torque is applied to them by the torsion spring between the ball and valve stem, so that the sealing member and the ball are locked during the valve opening/closing stroke without contacting against the seat, to achieve friction-free ball rotation. While closing the valve, the sealing member and the seat are aligned, the rotation of the ball is stopped, valve-closing torque transferred through valve stem continuously will overcome the torsion spring force, so that the sealing driving gear rotates with respect to the ball to transfer the torque to the sealing member through the gear set mechanism to build up mechanical energized sealing.

While opening the valve, the torsion spring will apply a torsion force to maintain the ball in the closing position, valve opening torque will drive the gear set mechanism and further drive sealing member to be tightened against the ball firstly, also the torsion spring will apply force on top to the valve closing torque to lock tightly the sealing member to the ball. The valve stem keeps rotating towards the valve opening direction, and the ball assembly rotates together with the valve stem until reaching the valve full-opening position. The torsion spring forms a simple-structure interlinked the movement of the valve stem, the ball and sealing driving gear, enables the ball assembly been tightened and locked in other positions than the full-closing position, as a result, the friction-free 90-degree rotation of the ball assembly is achieved, on the other hand, the potential damage of sealing member caused by the vibration due to turbulence of medium can be avoided when the valve is in full-open position.

The mechanical stop at valve lower trunnion separates the joint movement of the ball and the sealing driving gear:

Different from the conventional trunnion mounted ball valve, the lower trunnion of the ball is provided with a 90° fan-shaped projection, and the lower trunnion chamber of the valve body is provided with the 180° limiting slot corresponding to the lower trunnion of the ball. After the valve is assembled, the movement of the ball is strictly limited within the range of 90-degree open/close. When the ball is stopped at a closed position, valve closing torque applied by stem will overcome the force of torsion spring and drive gear set mechanism and rotate the threaded jack-up mechanism to achieve mechanical energized sealing.

The invention claimed is:

1. A mechanical energized sealing ball valve, comprising:
   a seat,
   a ball assembly, and
   a single valve stem, the single valve stem independent of any other valve stem;
   wherein the ball assembly comprises a ball and a sealing member;
   the single valve stem rotating the ball and operating the sealing member;
   the single valve stem connected to the sealing member by one or more gears;
   wherein rotation of the single valve stem first causes the ball to rotate between an open position and a closed position, and when the ball reaches the closed position, the continued rotation of the single valve stem presses the sealing member against the seat.

2. The mechanical energized sealing ball valve according to claim 1, wherein the one or more gears includes a thread driving wheel disposed on the ball and connected with the sealing member through threads, and the thread driving wheel causes the sealing member to move inwardly and outwardly.

3. The mechanical energized sealing ball valve according to claim 2, wherein the single valve stem causes the thread driving wheel to rotate.

4. The mechanical energized sealing ball valve according to claim 3, wherein the thread driving wheel is cut with gear teeth, and the single valve stem causes the thread driving wheel to rotate by way of a sealing driving gear of the one or more gears.

5. The mechanical energized sealing ball valve according to claim 4, wherein the one or more gears includes an intermediate transmission gear disposed between the thread driving wheel and the sealing driving gear.

6. The mechanical energized sealing ball valve according to claim 1, wherein the sealing member moves linearly with respect to the ball.

7. The mechanical energized sealing ball valve according to claim 1 wherein when the ball rotates to the closed position from the open position, the ball stops rotating and the single valve stem continues rotating towards the closing direction, causing the sealing member to move linearly towards the seat, causing the sealing member to sit against the seat.

8. The mechanical energized sealing ball valve according to claim 7, wherein the rotation stroke of the ball is 90°.

9. The mechanical energized sealing ball valve according to claim 8, wherein a lower trunnion of the ball is provided with a 90° fan-shaped projection, and a lower trunnion chamber of the valve body is provided with a 180° limiting slot.

10. The mechanical energized sealing ball valve according to claim 7, wherein the single valve stem drives the ball to rotate using an elastic component.

11. The mechanical energized sealing ball valve according to claim 10, wherein the elastic component is a torsion spring.

12. The mechanical energized sealing ball valve according to claim 11, wherein a torsion spring shaft is disposed at the bottom of the single valve stem, with the torsion spring surrounding the torsion spring shaft, and the single valve stem and the ball are respectively provided with torsion spring pin holes and a first torsion spring pin and a second torsion spring pin, with the first torsion spring pins embedded into the torsion spring pin holes of the single valve stem, and the second torsion spring pin embedded into the torsion spring pin holes of the ball.

13. The mechanical energized sealing ball valve according to claim 10, wherein the elastic element applies a pre-driving force to the ball for rotating the ball towards the closing position.

14. The mechanical energized sealing ball valve according to claim 1, wherein the sealing member retracts towards the ball and contacts the ball during the opening process of the mechanical energized sealing ball valve.

* * * * *